(12) United States Patent
Jo

(10) Patent No.: US 11,770,502 B2
(45) Date of Patent: Sep. 26, 2023

(54) IMAGE SURVEILLANCE APPARATUS APPLIED WITH MOVING-PATH TRACKING TECHNIQUE USING MULTI CAMERA

(71) Applicant: WORLD CNS, INC., Gwangmyeong-si (KR)

(72) Inventor: Seong Hyun Jo, Gwangmyeong-si (KR)

(73) Assignee: WORLD CNS, INC., Gwangmyeong-si (KR)

( * ) Notice: Subject to any disclaimer, the term of this patent is extended or adjusted under 35 U.S.C. 154(b) by 218 days.

(21) Appl. No.: 17/353,499

(22) Filed: Jun. 21, 2021

(65) Prior Publication Data

US 2021/0314531 A1 Oct. 7, 2021

Related U.S. Application Data

(63) Continuation of application No. PCT/KR2019/016549, filed on Nov. 28, 2019.

(30) Foreign Application Priority Data

Dec. 27, 2018 (KR) .......................... 10-2018-0170824

(51) Int. Cl.
*H04N 7/18* (2006.01)
*G06T 7/292* (2017.01)
(Continued)

(52) U.S. Cl.
CPC ............. *H04N 7/181* (2013.01); *G06T 7/292* (2017.01); *H04N 5/38* (2013.01); *H04N 23/51* (2023.01);
(Continued)

(58) Field of Classification Search
None
See application file for complete search history.

(56) References Cited

U.S. PATENT DOCUMENTS 3,562,513 A * 2/1971 Jaffe ...................... F21V 17/162
362/305
2017/0295324 A1* 10/2017 Cabral ................. H04N 23/698
(Continued)

FOREIGN PATENT DOCUMENTS

JP 2009182617 A * 8/2009
KR 10-1128367 B1 3/2012
(Continued)

OTHER PUBLICATIONS

International Search Report issued in PCT/KR2019/016549; dated Mar. 17, 2020.

*Primary Examiner* — Shadan E Haghani
(74) *Attorney, Agent, or Firm* — Studebaker & Brackett PC

(57) ABSTRACT

The present invention relates to an image surveillance apparatus applied with a moving-path tracking technique using a multi camera and, more specifically, to an image surveillance apparatus applied with a moving-path tracking technique using a multi camera, the image surveillance apparatus comprising a plurality of surround cameras arranged in a horizontal direction and a central camera located at the center of the surround cameras, wherein arrangements of the surround cameras and the central camera are restricted, a blind spot during surveillance of the image surveillance apparatus is minimized, and detection and automatic tracking of a moving object to be tracked are possible.

4 Claims, 10 Drawing Sheets

(51) Int. Cl.
      *H04N 5/38*         (2006.01)
      *H04N 23/51*      (2023.01)
      *H04N 23/90*      (2023.01)
      *H04N 23/698*     (2023.01)

(52) U.S. Cl.
      CPC ........... *H04N 23/698* (2023.01); *H04N 23/90* (2023.01); *G06T 2207/30232* (2013.01)

(56) References Cited

U.S. PATENT DOCUMENTS

2019/0098212 A1\*   3/2019   Shain ..................... H04N 23/90
2019/0251662 A1\*   8/2019   Ise ......................... G06T 3/4038

FOREIGN PATENT DOCUMENTS

KR     10-2017-0091325 A     8/2017
KR         10-1806840 B1   12/2017
WO    WO-2012056437 A1 \*  5/2012   ......... G02B 27/2228

\* cited by examiner

-- Prior Art --

-- Prior Art --

IMAGE SURVEILLANCE APPARATUS APPLIED WITH MOVING-PATH TRACKING TECHNIQUE USING MULTI CAMERA

CROSS-REFERENCE TO RELATED APPLICATIONS

The present application is a continuation of International Patent Application No. PCT/KR2019/016549, filed on Nov. 28, 2019, which is based upon and claims the benefit of priority to Korean Patent Application No. 10-2018-0170824, filed on Dec. 27, 2018. The disclosures of the above-listed applications are hereby incorporated by reference herein in their entirety.

TECHNICAL FIELD

The present invention relates to an image surveillance apparatus applied with a moving-path tracking technique using multi camera, and more particularly, to an image surveillance apparatus applied with a moving-path tracking technique using multi camera, which includes: a plurality of surround cameras arranged in a horizontal direction; and a central camera located at a center of the surround cameras, wherein arrangements of the surround cameras and the central camera are restricted, a blind spot during surveillance of the image surveillance apparatus is minimized, and detection and automatic tracking of a moving object to be tracked are possible.

BACKGROUND ART

In general, a CCTV system for remotely monitoring a surveillance area has been disclosed. The CCTV system according to the related art includes a camera having pan/tilt/zoom functions for photographing the surveillance area, an image receiving unit that receives an image from the camera, and a display unit that displays the received image on a screen. Because the conventional CCTV system of the above configuration is capable of panning or tilting operation, a relatively wide range may be monitored.

However, on the contrary, because the surveillance is required to be performed only based on the screen of the area targeted by the camera, the entire surveillance area cannot be monitored at once. In addition because any area beyond the targeted area of the camera becomes a blind spot for photographing, the system cannot properly function to effectively capture an intruder.

Further, recently, there is a growing interest in the development of technology for tracking moving paths using multi-cameras minimize blind spots, and enable detection and automatic tracking of a moving object to be tracked, so as to prevent crimes or respond to accidents such as traffic accidents.

DISCLOSURE

Technical Problem

The present invention is disclosed to meet the circumstances and needs as described above. An image surveillance apparatus applied with a moving-path tracking technique using multi camera is configured to include a housing module forming an exterior of the image surveillance apparatus; at least one or more surround cameras disposed inside the housing module and oriented outward from the housing module; and a central camera disposed in a central portion of the at least one or more surround cameras, wherein the surround cameras are circularly arranged at equal intervals around a center of the housing module and oriented outward from the housing module, and the central camera is disposed on a center line of the housing module, and disposed inside the housing module. The image surveillance apparatus applied with a moving-path tracking technique using multi camera is provided to minimize blind spots, and enable detection and automatic tracking of a moving object to be tracked, so that compact camera configurations with a minimum space and arrangement features can be facilitated, the surveillance distance can be maximized, the blind spot can be minimized, and a moving-path tracking technique for the monitoring target can be efficiently applied.

Technical Solution

In order to achieve the above-described technical problems, the present invention specifically provides an image surveillance apparatus applied with a moving-path tracking technique using multi camera, which includes: a housing module forming an exterior of the image surveillance apparatus; at least one or more surround cameras disposed inside the housing module and oriented outward from the housing module; and a central camera disposed in a central portion of the at least one or more surround cameras, wherein the surround cameras are circularly arranged at equal intervals around a center of the housing module and oriented outward from the housing module, and the central camera is disposed on a center line of the housing module, and disposed inside the housing module.

The housing module may include a fixture fixed to one surface of a building or the like to fix the housing module, a connection body coupled to one side of the fixture and formed with an inner space, and a lower cap coupled to the connection body to seal the inner space and constituting the housing module.

The surround camera may be composed of four cameras including a wide-angle lens, each of the surround cameras may be arranged to have an orientation angle of 90 degrees on the same plane, and each of the surround cameras may have a surveillance angle of 98 degrees or more in the horizontal direction. The central camera may be composed of one camera including a wide-angle lens, disposed in the center of the surround cameras to have an imaging angle perpendicular to the ground, and the central camera may have a surveillance angle of 73 degrees or more.

The fixture may include a protrusion portion or a screw processing portion formed on one side of the fixture, and the connection body may be coupled to the one side of the fixture by any one of a press-fitting coupling, a screw coupling, or a bolt coupling.

In addition, the lower cap may be coupled to one side of the connection body by any one of a press-fitting coupling, a screw coupling, or a bolt coupling, and may include at least one window (131) in which the surround camera or the central camera may partially protrude to the outside, or visible light or infrared light is transmissible to the lens of the surround camera (200) or the central camera (300) through the window.

The present invention may further include a communication unit disposed in the inner space of the housing module to transmit or receive information of the image surveillance apparatus to an outside by wire or wirelessly, and may further include an image processing unit disposed inside or outside the image surveillance apparatus, and configured to receive imaging information generated by the image surveillance apparatus through the communication unit and perform a moving path tracking for a surveillance object based on the imaging information.

Advantageous Effects

Based on the configurations of the image surveillance apparatus applied with a moving-path tracking technique using multi camera according to the embodiments of the present invention, compact camera configurations with a minimum space and arrangement features can be facilitated, the surveillance distance can be maximized, the blind spot can be minimized, and a moving-path tracking technique for the monitoring target can be efficiently applied.

BEST MODE

Mode for Invention

Figure 1:
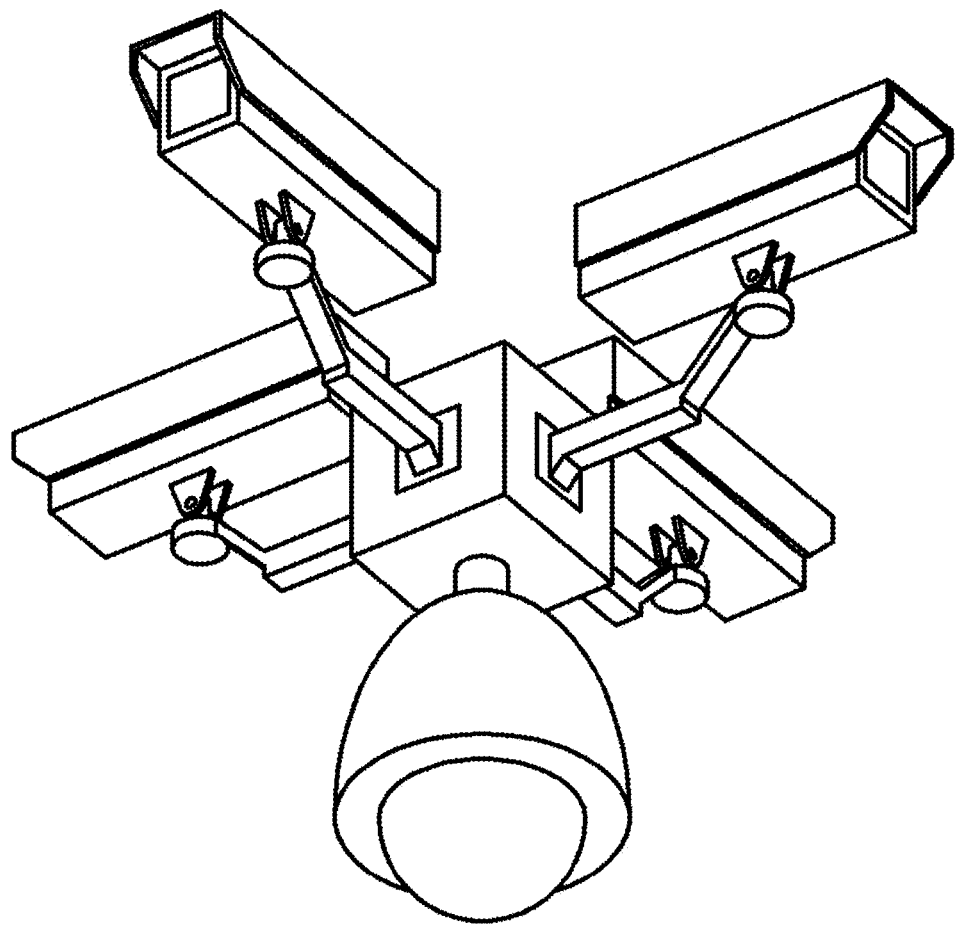
FIG. 1 is a perspective view showing a surveillance camera according to one embodiment of the related art in which a plurality of bullet cameras are combined with a speed dome cameras.

Hereinafter, some embodiments of the present invention will be described in detail with reference to exemplary drawings. It is noted that the same reference numerals are used for the same components as much as possible upon adding reference numerals to components of each drawing, even though indicated on different drawings. In addition, when the embodiments of the present invention are described, and if it is determined that a detailed description of a related specific configuration or function interferes with an understanding of embodiments of the present invention, the detailed description thereof will be omitted.

In addition, when the components of the embodiments of the present invention are described, terms such as first, second, A, B, (a), (b), and the like may be used. The terms are merely used to distinguish the component from other components, and the essence, sequence, or order of the corresponding component is not limited by the terms. When a component is described as being "linked", "coupled" or "connected" to a different component, it is understood that the component may be directly linked or connected to the different component, but another component may be "linked", "coupled" or "connected" between the components.

Hereinafter, specific embodiments of the present invention will be described with reference to the drawings.

Figure 2:
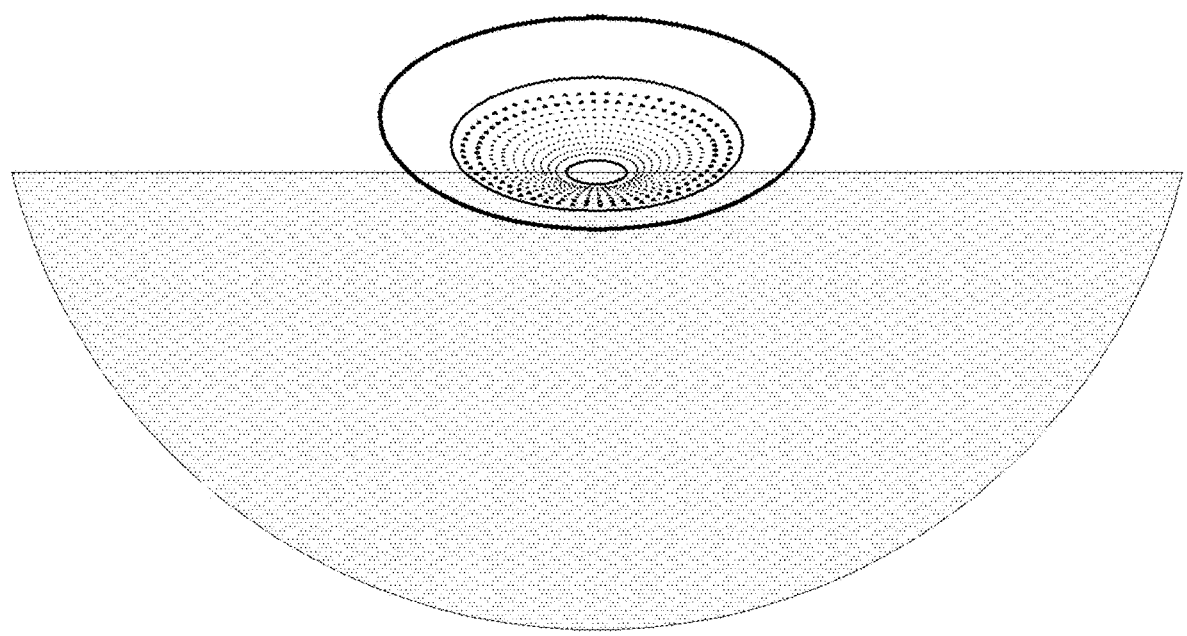
FIG. 2 is a perspective view showing a surveillance camera according to one embodiment of the related art to which a fisheye lens camera is applied.

FIG. 1 is a perspective view showing a surveillance camera according to one embodiment of the related art in which a plurality of bullet cameras are combined with a speed dome cameras. FIG. 2 is a perspective view showing a surveillance camera according to one embodiment of the related art to which a fisheye lens camera is applied.

In general, a CCTV system for remotely monitoring a surveillance area is disclosed in the related art.

The CCTV system according to the related art includes a camera having pan/tilt/zoom functions for photographing the surveillance area, an image receiving unit that receives an image from the camera, a display unit that displays the received image on a screen.

Because the conventional CCTV system of the above configuration is capable of panning or tilting operation, a relatively wide range may be monitored.

However, on the contrary, because the surveillance is required to be performed only based on the screen of the area targeted by the camera, the entire surveillance area cannot be monitored at once.

In addition, since two or more camera modules, instead of one camera module, are required to be disposed adjacent to each other in order to operate a surveillance system using different types of cameras, the installation space for the camera module are required to be increased, and a relatively large blind space of the shooting zone between the cameras is inevitable. Because any area beyond the targeted area of the camera becomes a blind spot for photographing, the system cannot properly function to effectively capture an intruder.

Further, recently, there is a growing interest in the development of technology for tracking moving paths using multi-cameras to minimize blind spots and enable detection and automatic tracking of a moving object to be tracked, so as to prevent crimes or respond to accidents such as traffic accidents.

Accordingly, the present invention is disclosed to meet the circumstances and needs as described above, and provides an image surveillance apparatus applied with a moving-path tracking technique using multi camera, which includes: a housing module forming an exterior of the image surveillance apparatus; at least one or more surround cameras disposed inside the housing module and oriented outward from the housing module; and a central camera disposed in a central portion of the at least one or more surround cameras, wherein the surround cameras are circularly arranged at equal intervals around a center of the housing module and oriented outward from the housing module, and the central camera is disposed on a center line of the housing module, and disposed inside the housing module, so that blind spots are minimized and detection and automatic tracking of a moving object to be tracked are possible. Thus, compact camera configurations with a minimum space and arrangement features can be facilitated, the surveillance distance can be maximized, the blind spot can be minimized, and a moving-path tracking technique for the monitoring target can be efficiently applied.

Figure 3:
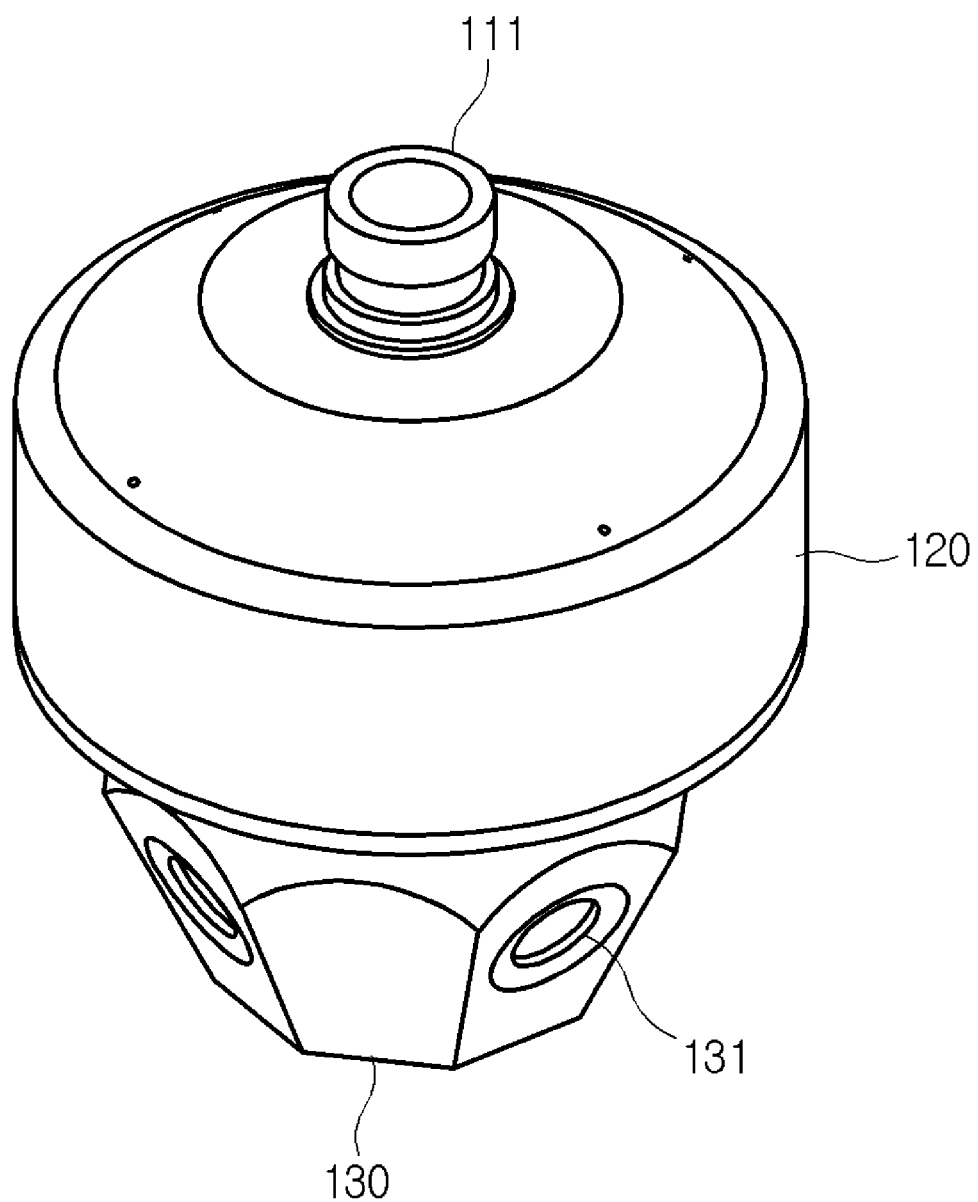
FIG. 3 is a perspective view showing an image surveillance apparatus applied with a moving-path tracking technique using multi camera according to one embodiment of the present invention.
Figure 4:
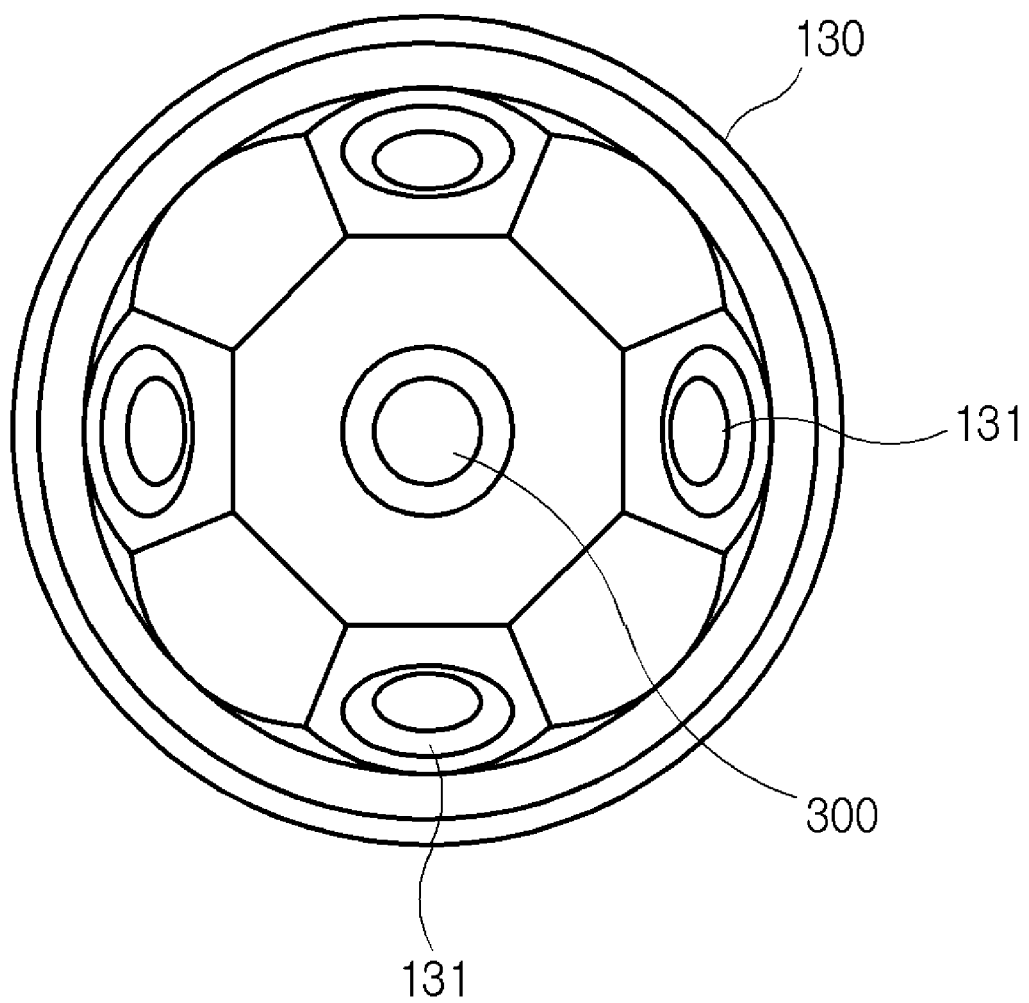
FIG. 4 is a bottom view showing the image surveillance apparatus applied with a moving-path tracking technique using multi camera according to one embodiment of the present invention.

FIG. 3 is a perspective view showing the image surveillance apparatus applied with a moving-path tracking technique using multi camera according to one embodiment of the present invention. FIG. 4 is a bottom view showing the image surveillance apparatus applied with a moving-path tracking technique using multi camera according to one embodiment of the present invention.

Figure 5:
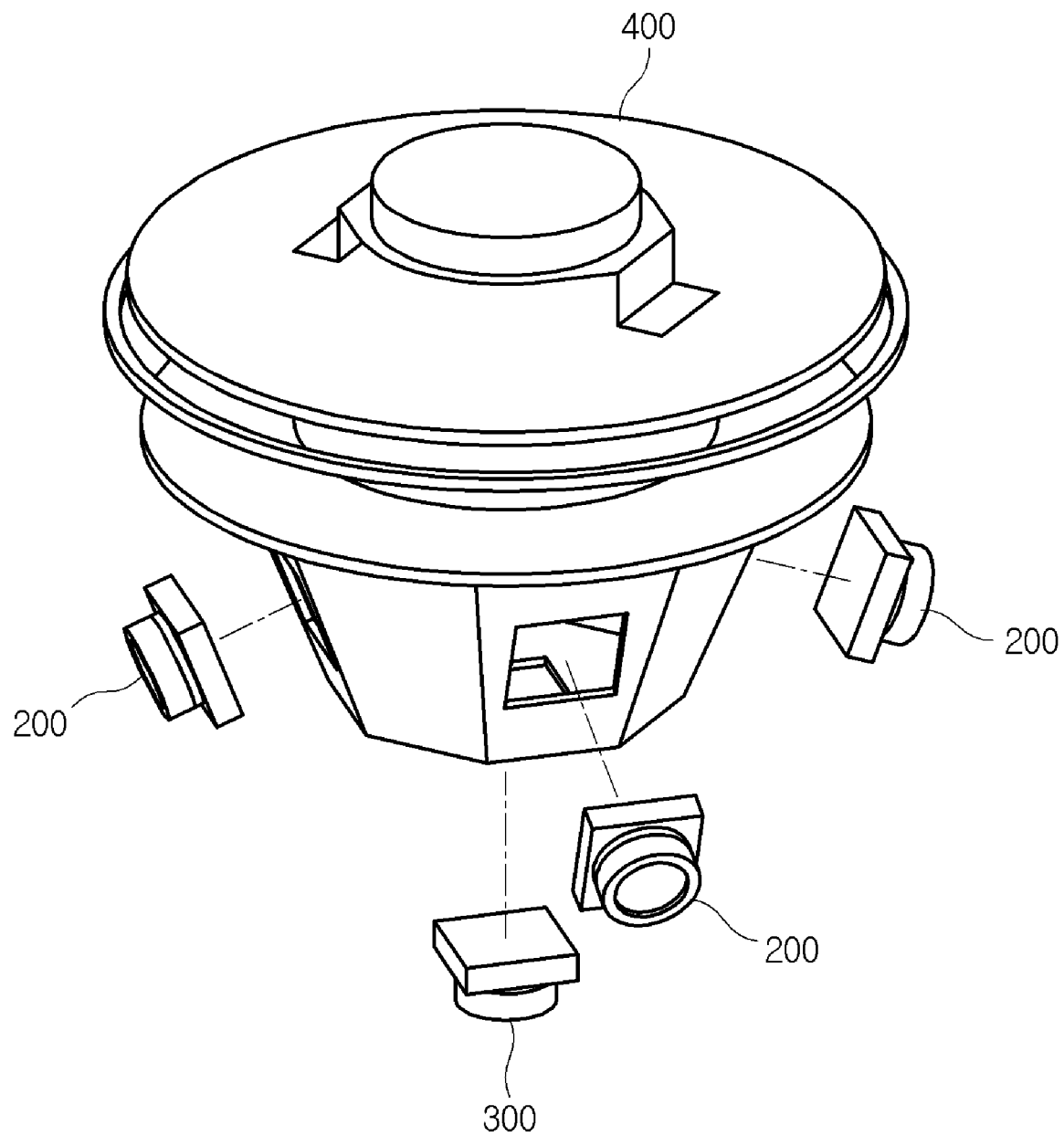
FIG. 5 is an internal exploded view showing the image surveillance apparatus applied with a moving-path tracking technique using multi camera according to one embodiment of the present invention.
Figure 6:
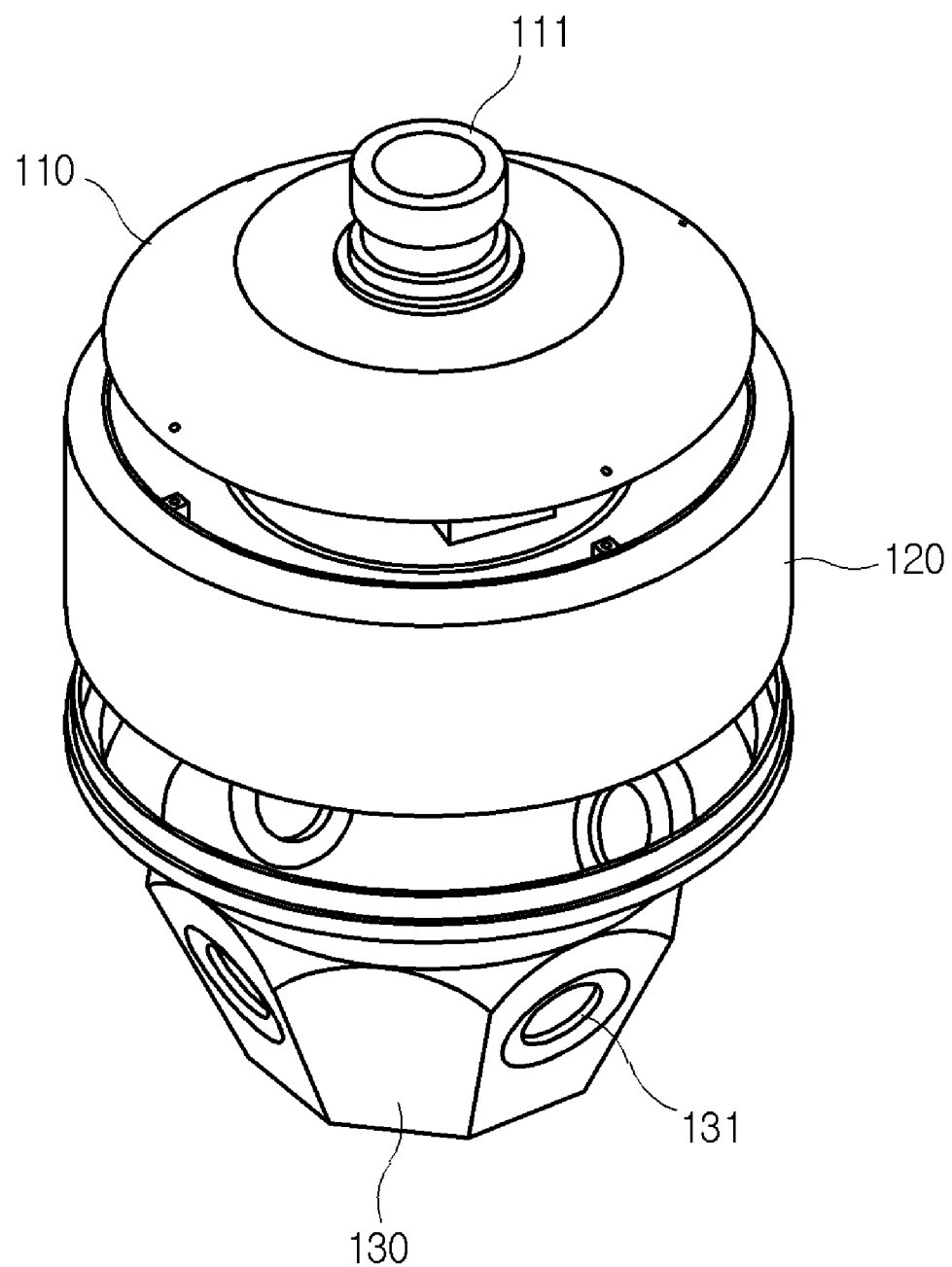
FIG. 6 is an exploded view of a housing showing the image surveillance apparatus applied with a moving-path tracking technique using multi camera according to one embodiment of the present invention.

In addition, FIG. 5 is an internal exploded view showing the image surveillance apparatus applied with a moving-path tracking technique using multi camera according to one embodiment of the present invention. FIG. 6 is an exploded view of a housing showing the image surveillance apparatus applied with a moving-path tracking technique using multi camera according to one embodiment of the present invention.

Specific embodiments for 'the image surveillance apparatus applied with a moving-path tracking technique using multi camera' of the present invention may be identified with reference to FIGS. 3 to 5.

More specifically, it is provided with an image surveillance apparatus applied with a moving-path tracking technique using multi camera, which includes: a housing module 100 forming an exterior of the image surveillance apparatus; at least one or more surround cameras 200 disposed inside the housing module 100 and oriented outward from the housing module 100; and a central camera 300 disposed in a central portion of the one or more surround cameras 200, wherein the surround cameras 200 are circularly arranged at equal intervals around a center of the housing module 100 and oriented outward from the housing module 100, and the central camera 300 is disposed on a center line of the housing module 100, and disposed inside the housing module 100.

At this point, the housing module 100 may include a fixture 110 fixed to one surface of a building and so on to fix the housing module 100; a connection body 120 coupled to one side of the fixture 110 and formed with an inner space; and a lower cap 130 coupled to the connection body 120 to seal the inner space and constituting the housing module 100.

Based on the above configurations, the at least one or more surround cameras 200 may be circularly arranged at equal intervals around a reference point the center of the housing module 100 and may be oriented outward from the housing module 100 while having a predetermined imaging angle.

In consideration of an imaging area and a blind spot area of the at least one or more surround cameras 200 oriented outward, the central camera 300 disposed in the central portion of the at least one or more surround cameras 200 may be disposed while maintaining a state partially overlapping the imaging area of the at least one or more surround cameras 200.

Figure 7:
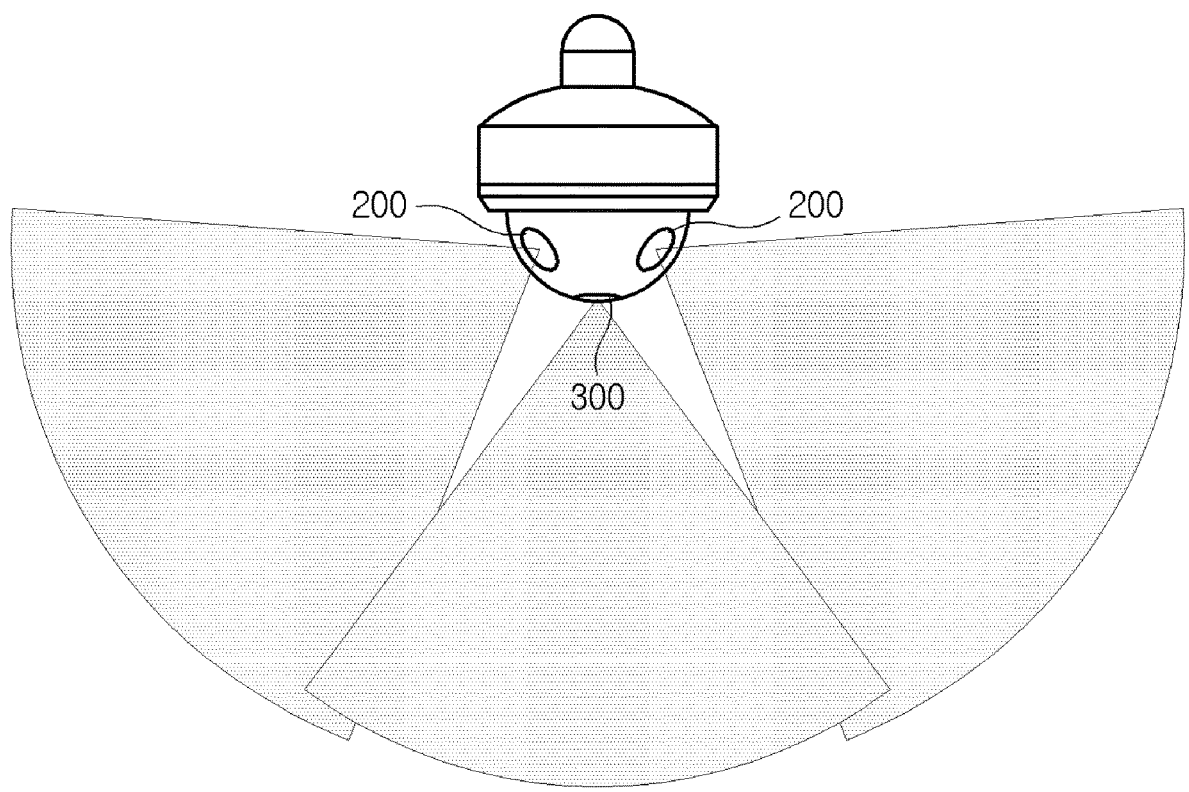
FIG. 7 is a schematic diagram showing the image surveillance apparatus applied with a moving-path tracking technique using multi camera according to one embodiment of the present invention.
Figure 8:
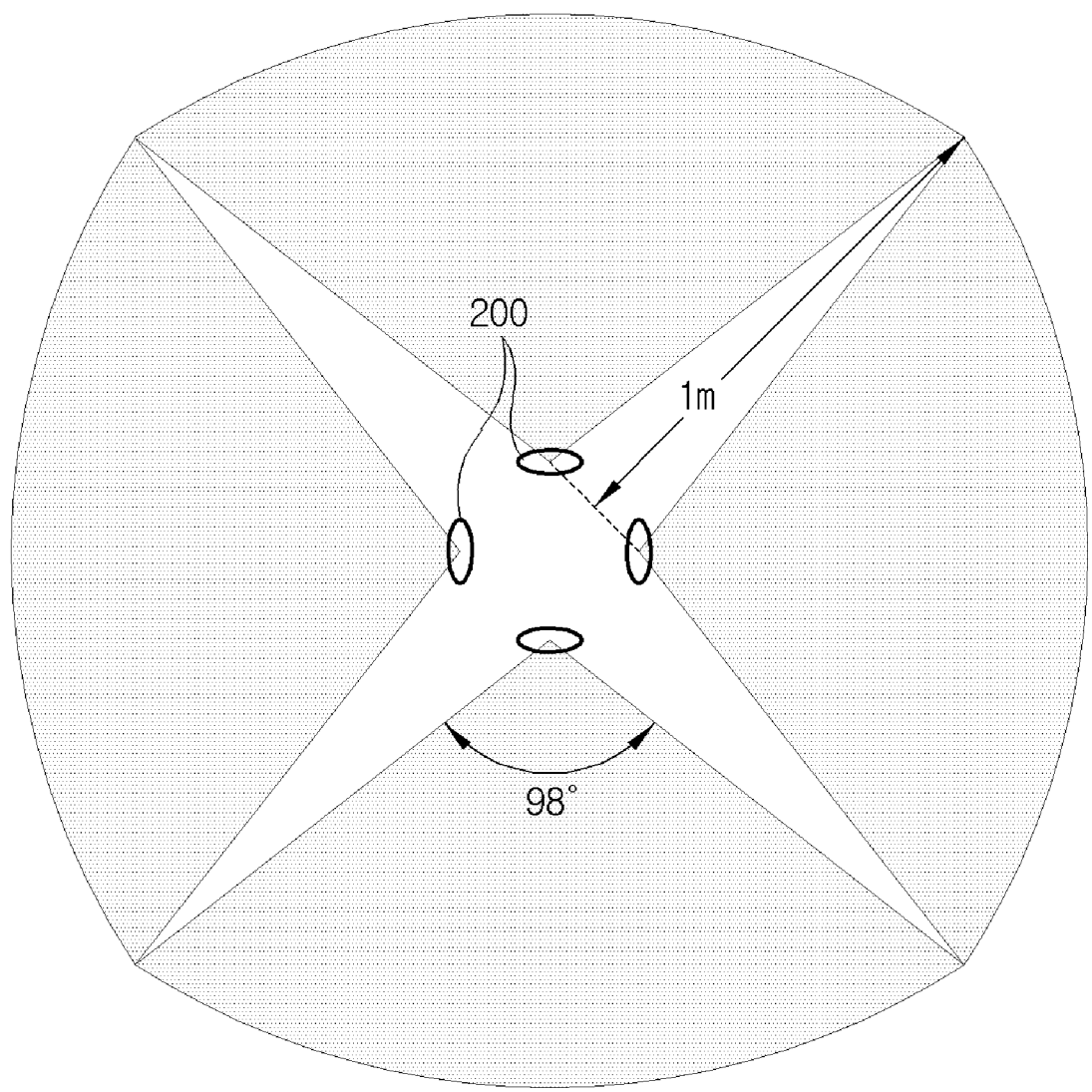
FIG. 8 is a conceptual diagram showing surveillance areas of a surround camera of the image surveillance apparatus applied with a moving-path tracking technique using multi camera according to one embodiment of the present invention.
Figure 9:
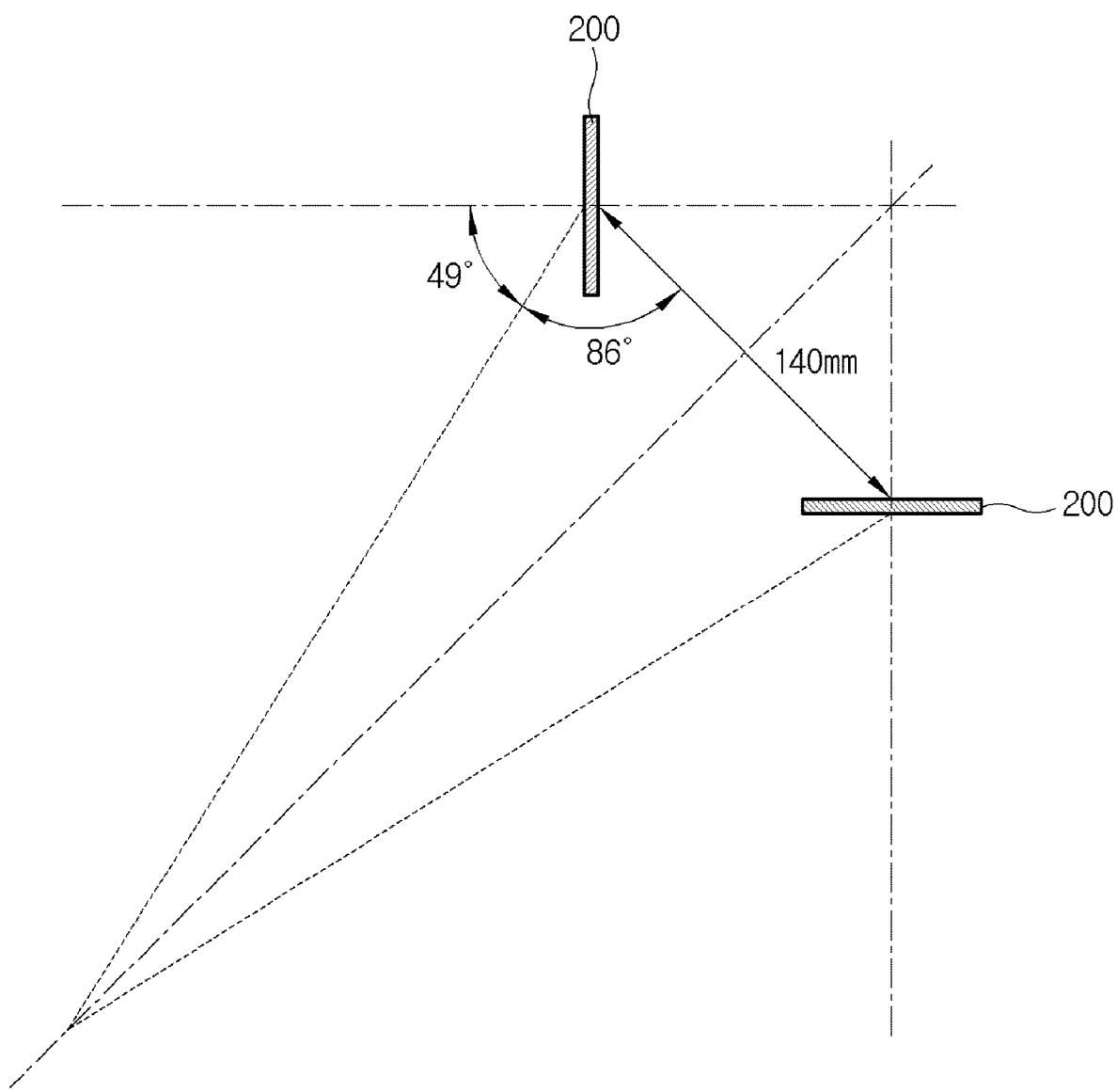
FIG. 9 is a conceptual diagram showing blind spots of the surround camera the image surveillance apparatus applied with a moving-path tracking technique using multi camera according to one embodiment of the present invention.

FIG. 7 is a schematic diagram showing the image surveillance apparatus applied with a moving-path tracking technique using multi camera according to one embodiment of the present invention. FIG. 8 is a conceptual diagram showing surveillance areas of a surround camera of the image surveillance apparatus applied with a moving-path tracking technique using multi camera according to one embodiment of the present invention. FIG. 9 is a conceptual diagram showing blind spots of the surround camera of the image surveillance apparatus applied with a moving-path tracking technique using multi camera according to one embodiment of the present invention.

In one embodiment of the present invention, the surround camera 200 may be composed of four cameras including a wide-angle lens, each of the surround cameras 200 is arranged to have an orientation angle of 90 degrees on a same plane, and each of the surround cameras 200 may have a surveillance angle of 98 degrees or more in a horizontal direction. The central camera 300 may be composed of one camera including a wide-angle lens, disposed in a center of the surround cameras 200 to have an imaging angle perpendicular to the ground, and the central camera 300 may have a surveillance angle of 73 degrees or more.

Due to the configuration of the surround cameras 200 and the central camera 300 having the characteristics of the orientation angle and the limit of the surveillance angle, the blind areas may be remarkably monitored and supplemented as seen through FIGS. 7 to 9, and a predetermined area may be arranged to include the overlapping portion, in which the overlapping portion may be corrected into a natural image through image warping and image blending processes, for panoramic image synthesis technology afterward.

In particular, the surround cameras 200 are circularly arranged to have a mutual spacing limited to 140 mm based on the imaging angle, so that the rectangular area has a length less than 1 m in the horizontal direction, and a substantive blind spot rarely exists based on the surveillance area of the central camera 300 that photographs downward.

More specifically, the image warping refers to representing input images into one pixel coordinate system in order to create a panoramic image by overcoming that the input images obtained from multiple cameras have the same size but have different coordinate systems.

When one of the input images is determined as a reference image, the remaining images may be regarded as images that are displayed by applying H corresponding to the images. When assumed that H is successfully obtained, if the inverse matrix of H is applied to the remaining images, an image integrated into the coordinate system of the reference image may be obtained. At this point, since all images are required to be expressed in the coordinate system of one reference image, it may be expressed as in Equation 1 below.

$$I_1$$
$$I_3 = H_{21} \times H_{32} \times I_3 I_2 = H_{21} \times I_2$$
$$\ldots \qquad [\text{Equation 1}]$$

At this point, it is preferable to additionally perform an image blending process after the image warping. The image blending process refers to a post-processing process for allowing matched image to be displayed visually naturally. Since the images arranged into one image through the warping process are not properly processed for overlapping areas, correction is required through the blending process.

According to the present invention, a multi-band blending scheme may be used to this end, and Gaussian and Laplacian pyramids may be used for the multi-band blending scheme.

Since the general panorama image matching scheme, which passes through all the processes of homography matrix calculation, image warping, and image blending, has a large amount of computation, the real-time image matching is impossible, and the matching speed is slow compared to the photographed video streaming. Thus, the present invention may use five fixed camera modules so as to omit unnecessary steps such as feature point detecting, matching or the like required for the homography mattress calculation.

To this end, images may be read from the camera module, every two adjacent images may be primarily matched using a pre-calculated homography matrix and implemented as four separate threads in the next step, and a queue serving as a buffer may be arranged between the threads so as to be used data exchange.

The first thread is an image receiving thread, and may be generated as many as the number of camera modules to receive video from each board. The second thread is a control thread, and may sequentially receive frames from the received videos, collect frames required to be matched into one, and pass the collected frames to the third thread. The third thread is a matching thread, and n threads may be generated to improve speed so as to process tasks in parallel.

Herein, n is a constant, and generally may be set to be suitable to a matching processor.

The matching thread matches the received frames into one frame by applying warping and blending to the received frames, and the matched frames may be delivered to a streaming queue which each matching thread has. The last thread is a streaming thread, and may sequentially receive the matched images from the streaming queue and transmit the received matched images.

In addition to the above processes, a detecting and automatic tracking technology for a moving object to be tracked may be added.

More specifically, a background subtraction scheme may be used as the most effective scheme among proposed schemes for detecting a foreground object.

First, after a background scene is modeled, the input image is compared with the background scene model. When the difference is significant, the pixels are displayed as foreground pixels and detected as foreground objects. It proceeds in the following sequence.

Image frame-Scene modeling-Foreground mask extraction-Foreground mask correction-Moving object detection At this point, the foreground mask may be configured as a binary image processed such that foreground pixels have a value of 1 and background pixels have a value of 0.

The binary image refers to the foreground as white and the background as black. The most important thing in the foreground mask extraction is that the background scene modeling is required to be performed excellently.

Accordingly, the background scene received as image data has many aspects to be considered, such as changes in lighting, moving background objects in the scene grass, trees, lakes, or the like swaying in the wind, and movements of a parked vehicle. It is desirable to use an adaptive mixed Gaussian model method (GMM) that is excellent for simultaneously processing the above multiple conditions.

The adaptive mixed Gaussian model may be used as 3 to 5 distributions per pixel, and may be regarded as a foreground when the calculation of the background model is completed and differs from values of the models by 2.5 times or more.

Through the above scheme, a pixel value serving as the foreground has a value of 1, which may indicate white in the binary mask image. When the above process is completed, the foreground mask extraction is completed, in which the foreground mask image may have an excessively protruding shape or a blob with excessive hole, so correction for the blob shape is required. It is the foreground mask correction that is performed in the above case. In general, the foreground mask correction may be performed by processing a morphology operation, such as open or close, as a pre-processing step.

The object extraction scheme suitable for the surveillance system is the background subtraction. Since the background subtraction models the background of each pixel by using the Gaussian mixture model instead of a single Gaussian distribution, multiple backgrounds, such as changes in luminance over time, or branches shaking by the wind, can be modeled.

In addition, since a distinguishing basis between the background and the foreground is adaptively learned without relying on a fixed threshold, it can be strongly suitable for changes in the environment.

In order to extract the above-described motion information, only information on objects with motion may be extracted by applying the Gaussian mixture method (GMM) to the pre-processed image obtained by separating the entire background from the camera image data.

In the GMM, a background model may be formed by unsupervised learning through continuous frames, and then motion information may be extracted based on the formed background model. Accordingly, when the GMM is applied to the preprocessed image obtained by separating the foreground/background, only the portions having movements can be distinguished by excluding false motion information due to background noise, and determining even object portions having no movement as the background.

The configuration of the present invention will be additionally described. The fixture 110 may include a protrusion portion 111 or screw processing portion formed on one side of the fixture 110. The connection body 120 may be coupled to the one side of the fixture 110 by any one of a press-fitting coupling, a screw coupling, or a bolt coupling.

In other words, an insertion hole or screw processing portion may be provided to correspond to a ceiling, wall or the like of a building installed therein with apparatus of the present invention, and the protrusion portion 111 of the present invention may be inserted thereto, or the fixture 110 may be easily fixed through a screw processing portion that may be processed to an outer circumferential surface or an inner circumferential surface of the protrusion portion 111.

Further, in order to easily and firmly couple one side of the fixture 110 to the connection body 120, an inner circumferential or outer circumferential surface of the one side of the fixture and an inner circumferential or outer circumferential surface of one side of the connection body 120 may be processed so that mutual coupling may be induced.

In addition, the lower cap 130 may be coupled to one side of the connection body 120 by any one of a press-fitting coupling, a screw coupling, or a bolt coupling, and may include at least one window 131 in which a part of the surround camera 200 or the central camera 300 protrudes to an outside or visible light or infrared light is transmissible to the lens of the surround camera 200 or the central camera 300 through the window.

The window 131 may be formed as an open space or may be formed of transparent glass or plastic.

According to the above configuration of the lower cap 130, visible light or infrared light may be transmissible through the lens of the surround camera 200 or the central camera 300, and five or more cameras may be all accommodated inside one housing lower cap 130, so that foreign substances or the like may be prevented from permeating and stable photographed images may be obtained.

In addition, the present invention may further include a communication unit 400 disposed in the inner space of the housing module 100 to transmit or receive information of the image surveillance apparatus to an outside by wire or wirelessly.

In addition, the present invention may further include an image processing unit disposed inside or outside the image surveillance apparatus and configured to receive imaging information generated by the image surveillance apparatus through the communication unit 400 and perform a moving path tracking for a surveillance object based on the imaging information.

Figure 10:
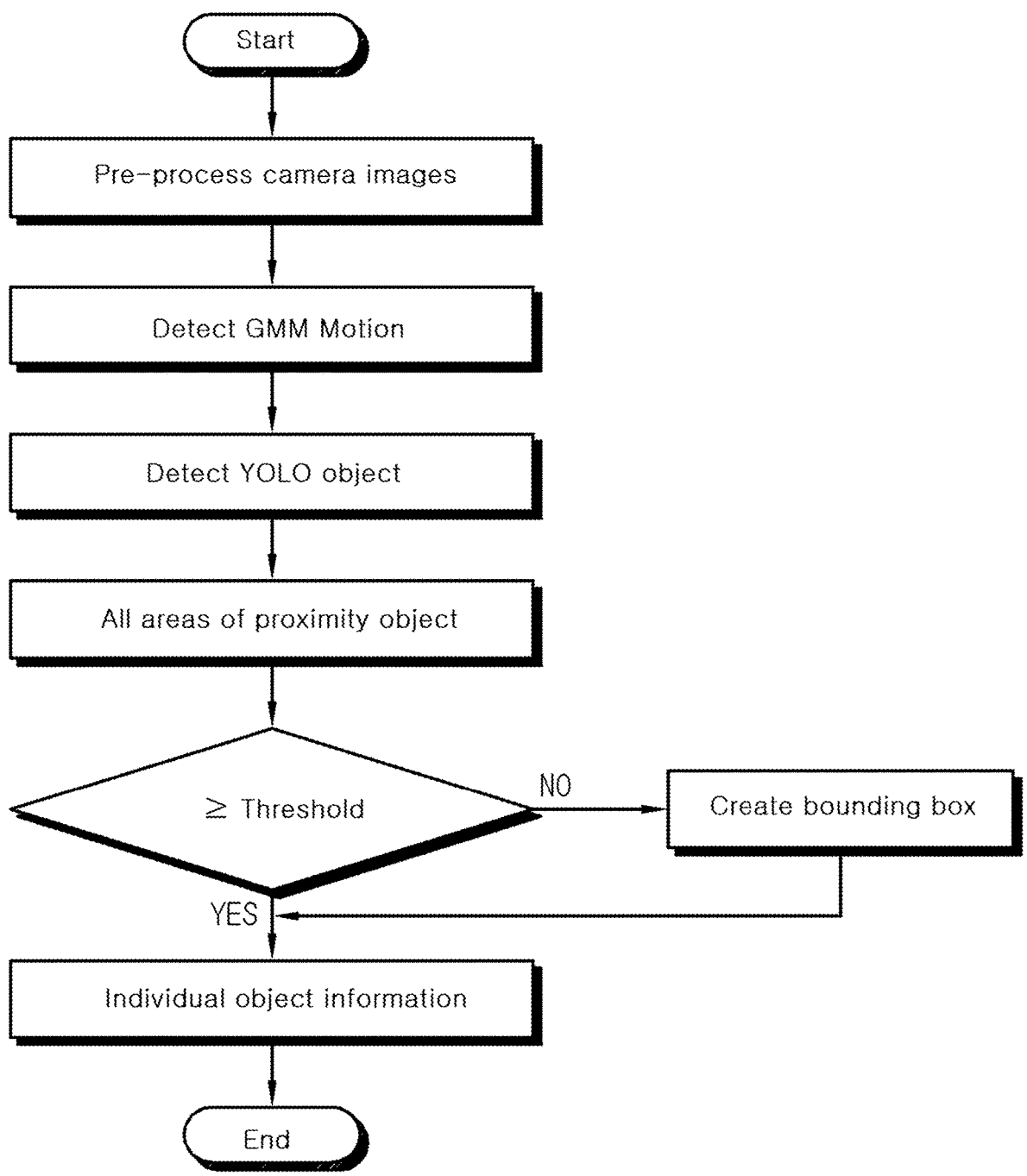
FIG. 10 is a flowchart of the real-time object segmentation process of the image surveillance apparatus applied with a moving-path tracking technique using multi camera according to one embodiment of the present invention.

FIG. 10 is a flowchart of the real-time object segmentation process of the image surveillance apparatus applied with a moving-path tracking technique using multi camera according to one embodiment of the present invention.

A deep learning technique including real-time object segmentation will be described with reference to FIG. 10.

Among deep learning techniques, object detection is the most studied and used technique in the field of computer vision, and may detect all specific objects in the images and display position information as a bounding box.

Widely used deep learning-based object detection techniques include a regions-with-CNN (R-CNN) and a fast/faster R-CNN, which is an improved version of R-CNN.

According to the above existing deep learning detection techniques, a single image is segmented into multiple regions composed of various positions and sizes based on a classifier or localizer, and then a neural network model is applied to each region.

In particular, whereas R-CNN has the feature thousands of CNN models are applied to a single image by using a region proposal scheme, the You Only Look Once (YOLO) applies one neural network to the entire image through a grid scheme, so the YOLO can be very efficient compared to the existing classifier-based detection techniques.

Accordingly, the YOLO may detect objects in real time, and particularly, may detect objects at least 1,000 times faster than R-CNN and 100 times faster than Fast R-CNN.

The neural network of the YOLO segments the entire image into grid cells in the detection process, predicts the bounding box for each grid cell and calculates the probability.

In addition, the bounding box is weighted by using the calculated probability, so that the bounding boxes for 200 classes may be detected. Accordingly, the YOLO may also reduce the loss of detection accuracy compared to the existing classifier-based scheme.

According to the present invention, the YOLO, which is one of deep learning techniques, may be applied to the extracted object information, so that only the object to be observed may be detected, thereby obtaining the bounding box. The YOLO algorithm is one of the best object detection algorithms in the CNN series, and may use the grid scheme unlike the R-CNN using a region proposal scheme, so that the object may be efficiently detected in real time.

According to the present invention, the previously created input image of the YOLO contains only the proximity object foreground having a motion, and does not contain objects and backgrounds that do not have motions. A new deep learning technique may be applied to the input image of the YOLO, so that an image, in which a detection result on an individual object is displayed as a bounding box, may be obtained.

In addition, when a digital zoom screen is separated through the detection result in the subsequent image processing process, a text file including bounding box information x coordinate, y coordinate, width, and height may be additionally obtained in order to utilize the bounding box information of each frame.

A proximity process using deep learning may be shown in FIG. 10.

Since unnecessary elements other than observation objects have already been deleted from the input images of the YOLO, a class to be detected is an object to be separated, and may be defined as a single class.

In the YOLO algorithm, the input image may be primarily equally divided into randomly set S×S grid cells, and n bounding boxes having information on x coordinate, y coordinate, width, and height, and probability information on being an object may be predicted through each grid cell. In other words, through the above processes, each cell may predict a large number of bounding boxes containing the object probability information, and the object may be detected by extracting a bounding box having a probability greater than or equal to a threshold. See FIG. 10.

The above descriptions are merely illustrative of the technical idea of the present invention, and it will be apparent that a person having ordinary skill in the art may carry out various deformations and modifications within the scope without departing from inherent features of the present invention. Therefore, the embodiments disclosed in the present invention are intended to not limit but illustrate the technical idea of the present invention, so the scope of the technical idea of the present invention is not limited by those embodiments. The protection scope of the present invention should be understood according to the following claims, and all technical ideas within the scope of equivalents should be construed as falling within the scope of the present invention.

[Sequence List Text]
100: Housing module
110: Fixture
111: Protrusion portion
120: Connection body
130: Lower cap
131: Window
200: Surround camera
300: Central Camera
400: Communication unit

The invention claimed is:

1. An image surveillance apparatus applied with a moving-path tracking technique using multi camera, the image surveillance apparatus comprising:
  a housing module (100) forming an exterior of the image surveillance apparatus;
  at least one or more surround cameras (200) disposed inside the housing module (100) and oriented outward of the housing module (100); and
  a central camera (300) disposed in a central portion of the at least one or more surround cameras (200),
  wherein the surround cameras (200) are circularly arranged at equal intervals around a center of the housing module (100) and oriented outward from the housing module (100), and the central camera (300) is disposed on a center line of the housing module (100), and disposed inside the housing module (100),
  wherein the housing module (100) includes:
  a fixture (110) fixed to one surface of a building to fix the housing module (100);
  a connection body (120) coupled to one side of the fixture (110) and defining an inner space; and a lower cap (130) coupled to the connection body (120) to seal the inner space and constituting the housing module (100), wherein the surround cameras (200) are composed of four cameras including a wide-angle lens, each of the surround cameras (200) is arranged to have an orientation angle of 90 degrees on a same plane, and each of the surround cameras (200) has a surveillance angle of 98 degrees or more in a horizontal direction, wherein the central camera (300) is composed of one camera including a wide-angle lens, and disposed in a center of the surround cameras (200) to have an imaging angle perpendicular to the ground, and the central camera (300) has a surveillance angle of 73 degrees or more, wherein the fixture (110) includes a protrusion portion (111) formed on one side of the fixture (110); or a screw processing portion, wherein the connection body (120) is coupled to the one side of the fixture (110) by any one of a press-fitting coupling, a screw coupling, or a bolt coupling, and wherein the lower cap (130) is coupled to one side of the connection body (120) by any one of a press-fitting coupling, a screw coupling, or a bolt coupling, and includes at least one window (131) in which a part of the surround.

2. The image surveillance apparatus of claim 1, further comprising:

a communication unit (400) disposed in the inner space of the housing module (100) to transmit or receive information of the image surveillance apparatus to an outside by wire or wirelessly.

3. The image surveillance apparatus of claim 2, further comprising:

an image processing unit disposed inside or outside the image surveillance apparatus, and configured to receive imaging information generated by the image surveillance apparatus through the communication unit (400) and perform a moving path tracking for a surveillance object based on the imaging information.

4. The image surveillance apparatus of claim 3, wherein an image synthesis technology is adopted to combine photographed images of the multi camera into one panoramic image through the image processing unit.

* * * * *